United States Patent
Zerwekh et al.

(10) Patent No.: US 6,601,022 B2
(45) Date of Patent: Jul. 29, 2003

(54) SYSTEM AND METHOD DETECTING AND MONITORING NONCOMPLIANT INTERSTATE TRANSPORTATION OF MATERIALS

(75) Inventors: William D. Zerwekh, Los Alamos, NM (US); Jacobo P. Lucero, Espanola, NM (US); Gerald C. Langner, Los Alamos, NM (US); Ted R. Martinez, Albuquerque, NM (US)

(73) Assignee: MCT Industries, Albuquerque, AZ (US)

( * ) Notice: Subject to any disclaimer, the term of this patent is extended or adjusted under 35 U.S.C. 154(b) by 0 days.

(21) Appl. No.: 10/075,856

(22) Filed: Feb. 12, 2002

(65) Prior Publication Data

US 2003/0065485 A1 Apr. 3, 2003

Related U.S. Application Data

(60) Provisional application No. 60/326,172, filed on Sep. 28, 2001.

(51) Int. Cl.$^7$ .............................................. G01N 21/00
(52) U.S. Cl. ...................................... 702/188; 700/219
(58) Field of Search ............................ 702/188, 27, 28, 702/30, 104, 137; 324/307, 312, 316, 326, 332, 344, 348, 464, 469; 378/1, 4, 7, 21, 22, 51, 54, 86; 701/2; 700/9, 213, 219, 221

(56) References Cited

U.S. PATENT DOCUMENTS

| | | | | |
|---|---|---|---|---|
| 4,019,053 A | * | 4/1977 | Levine | 250/303 |
| 4,864,142 A | * | 9/1989 | Gomberg | 250/390.02 |
| 5,008,661 A | * | 4/1991 | Raj | 340/10.33 |
| 5,098,640 A | * | 3/1992 | Gozani et al. | 376/159 |
| 5,210,702 A | * | 5/1993 | Bishop et al. | 250/338.5 |
| 5,498,872 A | * | 3/1996 | Stedman et al. | 250/338.5 |
| 5,524,133 A | * | 6/1996 | Neale et al. | 250/393 |
| 5,591,975 A | * | 1/1997 | Jack et al. | 250/338.5 |
| 5,600,303 A | * | 2/1997 | Husseiny et al. | 340/568.1 |
| 5,679,956 A | * | 10/1997 | Johnston | 250/357.1 |
| 5,719,396 A | * | 2/1998 | Jack et al. | 250/338.5 |
| 5,726,450 A | * | 3/1998 | Peterson et al. | 250/338.5 |
| 5,828,334 A | * | 10/1998 | Deegan | 342/192 |
| 5,877,862 A | * | 3/1999 | Nelson et al. | 250/343 |
| 6,043,867 A | * | 3/2000 | Saban | 244/3.11 |
| 6,061,695 A | * | 5/2000 | Slivka et al. | 345/629 |
| 6,216,540 B1 | * | 4/2001 | Nelson et al. | 73/633 |

OTHER PUBLICATIONS

"Automated Contamination Monitors," Thermo Eberline–Vanguard Security Systems, www.eberlineinst.com, Sep. 12, 2001.

"Track/Rail Deterction Systems," Rad Comm Systems, radcommsystems.com, Sep. 14, 2001.

* cited by examiner

Primary Examiner—Marc S. Hoff
Assistant Examiner—Edward Raymond
(74) Attorney, Agent, or Firm—Sawyer Law Group LLP

(57) ABSTRACT

A method and system for detecting and monitoring noncompliant interstate transportation of materials is disclosed. The method and system include providing a detection and monitoring network whereby multiple ports-of-entry are each equipped with a detection system that is in communication with a central computer. The detection systems are then used to detect levels of a material in vehicles passing through the ports-of-entry. The method and system further include associating the levels of material detected for each vehicle with the respective vehicle, and saving the vehicle material levels on a computer. The material levels detected at each port-of-entry are then uploaded to the central computer for monitoring and review.

34 Claims, 4 Drawing Sheets

SYSTEM AND METHOD DETECTING AND MONITORING NONCOMPLIANT INTERSTATE TRANSPORTATION OF MATERIALS

CROSS-REFERENCE TO RELATED APPLICATION

This application is claiming under 35 U.S.C. §119(e) the benefit of Provisional Patent Application Ser. No. 60/326,172, filed Sep. 28, 2001.

FIELD OF THE INVENTION

The present invention relates to vehicle radiation detection systems, and more particularly to a system for detecting and monitoring noncompliant interstate transportation of radioactive materials.

BACKGROUND OF THE INVENTION

Vehicle and rail radiation detection systems that detect the presence of radioactive materials in vehicles containing scrap metals or waste materials are known. The systems are typically installed at metal recycling centers or waste dumps to monitor vehicles entering the site to ensure that no material being dumped emits radiation above a certain level. Examples of such systems include the Vehicle and Rail Radiation Detection System by Rad/Comm Systems of Valparaiso, Indi., and the Vanguard System by ThermoEberline of Santa Fe, N.Mex.

These systems typically include a microprocessor controller and large detector assemblies mounted on each side of a vehicle pass-through such as, a or railroad track. In operation, a truck or rail car passes the detectors and the data collected by the detectors is transferred to the controller. If the detected radiation levels exceed a certain threshold, the controller emits an alarm to alert an operator. In the Vanguard system, the detected radiation levels collected by the detectors are continually printed as a graph on a paper tape for viewing by the operator.

Although such systems effectively inform an operator of radioactive loads, the systems have disadvantages. One problem is that there is no association between the plotted radiation levels and the vehicles passing-through the system. That is, the operator has no way of knowing which radiation levels on the graph belong to which truck.

Another problem is that once a vehicle sets off the alarm and the vehicle leaves the site, there is no way to monitor the whereabouts of the vehicle. Finally, little or no thought is given to how the information about the vehicle should be used or communicated to proper authorities.

Although current detection systems protect against the dumping of noncompliant materials such as radioactive waste, these systems fail to protect against illegal and noncompliant interstate transportation of such materials. The present invention addresses such a need.

SUMMARY OF THE INVENTION

The present invention provides a method and system for detecting and monitoring noncompliant interstate transportation of materials. The method and system include providing a detection and monitoring network whereby multiple ports-of-entry are each equipped with a detection system that is in communication with a central computer. The detection systems are then used to detect levels of a material in vehicles passing through the ports-of-entry. The method and system further include associating the levels of material detected for each vehicle with the respective vehicle, and saving the vehicle material levels on a computer. The material levels detected at each port-of-entry are then uploaded to the central computer for monitoring and review.

According to the method and system disclosed herein, the present invention associates the detector data with the appropriate vehicles and allows the proper authorities to be notified of vehicles transporting noncompliant and/or illegal payloads across state and national borders with minimal manpower.

DETAILED DESCRIPTION OF THE INVENTION

The present invention relates to the detection and reporting of noncompliant or illegal transportation of materials. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Due to the increased use of nuclear energy and the disarmament of nuclear weapons, the interstate transportation of nuclear waste for disposal is proliferating. The applicants of the present application have recognized that the rising amounts of nuclear materials on interstate highways and other forms of transportation provide greater opportunity for the materials falling into the hands of terrorists, and increases the risk of abuses by transporters who are anxious to cut costs.

Current means for detecting such noncompliant transportation across state and national borders are inadequate. On interstate highways, trucks passing state borders pass-through a port-of-entry in which the trucks are sometimes measured for radioactivity by an operator performing a hand-held scan of the truck. This method not only requires human intervention, but is also error prone. First, not all port-of-entry may be equipped with hand-held scanners. And for the ones that are, only suspicious trucks are typically checked, leaving the potential for many noncompliant trucks to pass-through undetected. In addition, states do not have the manpower to check the thousands of trucks traversing the nation's ports-of-entries nor the training resources necessary to train more operators. Therefore, there is a long felt but unsolved need to protect the public from illegal and noncompliant interstate transportation of materials, such as radioactive waste.

The present invention addresses this need by providing an interstate transportation detection and monitoring network, whereby state and national ports-of-entry are equipped with vehicle radiation detection systems that measure and save the detected radiation levels of each vehicle in an electronic file, and associate the file with the respective vehicle. Each port-of-entry detection system then transmits the vehicle radiation files to a central database for governmental monitoring and review. According to the present invention, the port-of-entry detection systems allows the proper governmental agency to be notified of vehicles transporting non-compliant and/or illegal payloads across state and national borders with minimal manpower.

Figure 1:
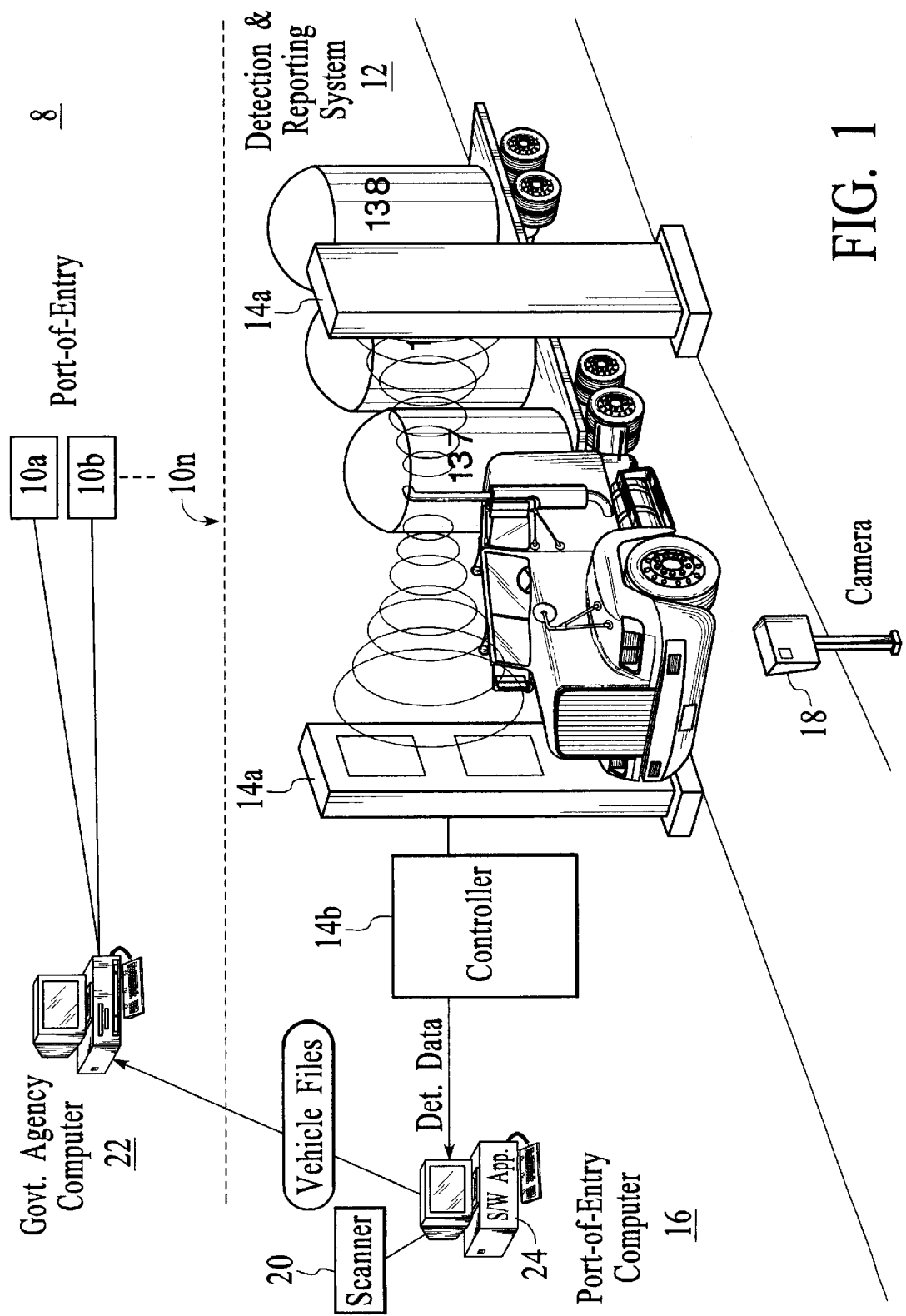
FIG. 1 is a diagram illustrating a port-of-entry detection and reporting network in accordance with a preferred embodiment of the present invention.

Referring now to FIG. 1, a port-of-entry detection and reporting network is shown in accordance with a preferred embodiment of the present invention. According to the present invention, the port-of-entry detection and monitoring network 8 comprises multiple state and/or national ports of entry 10, which each are equipped with a detection and reporting system 12 that are in communication with a central government agency computer 22.

Each detection and reporting system 12 at the ports-of-entry 10 include a detector system 14, which includes detector assemblies 14a mounted on each side of a vehicle pass-through and a controller 14b. In a preferred embodiment, the detector assemblies 14b detect radiation levels. As stated above, examples of such systems include radiation detection systems produced by RadComm and ThermoEberline. Those of ordinary skill in the art, however, will readily understand that the present invention may be used with other types of detectors that detect the levels other materials, such as drugs or bombs, for example.

According to the present invention, a computer 16 is connected between the detector system 14 and the government agency computer 22. A digital camera 18 and a scanner 20 are connected to the computer 16. According to the present invention, the computer 16 is connected to the controller 14b and runs a software application 24 that extracts the stream of detector data from the controller 14b, and saves the data in a file for each vehicle. The computer 16 then reports the detected radiation levels of each vehicle to the central government agency computer 22.

The government agency computer 22 may be run by either a state or federal agency (e.g., an Environmental Protection Agency or Department of Transportation). According to another aspect of the present invention, the detection and monitoring network may be used within a single state to create a state network, used within a group of states to create a regional network, or used across the nation to create a federal network.

Figure 2:
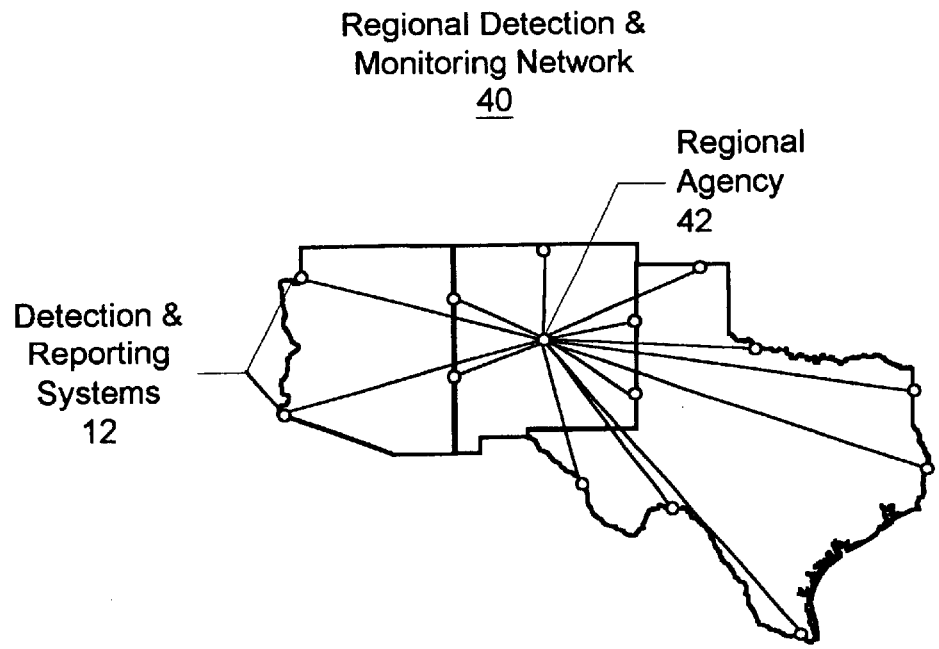
FIGS. 2 and 3 are diagrams illustrating regional and federal detection and monitoring network, respectively.
Figure 3:
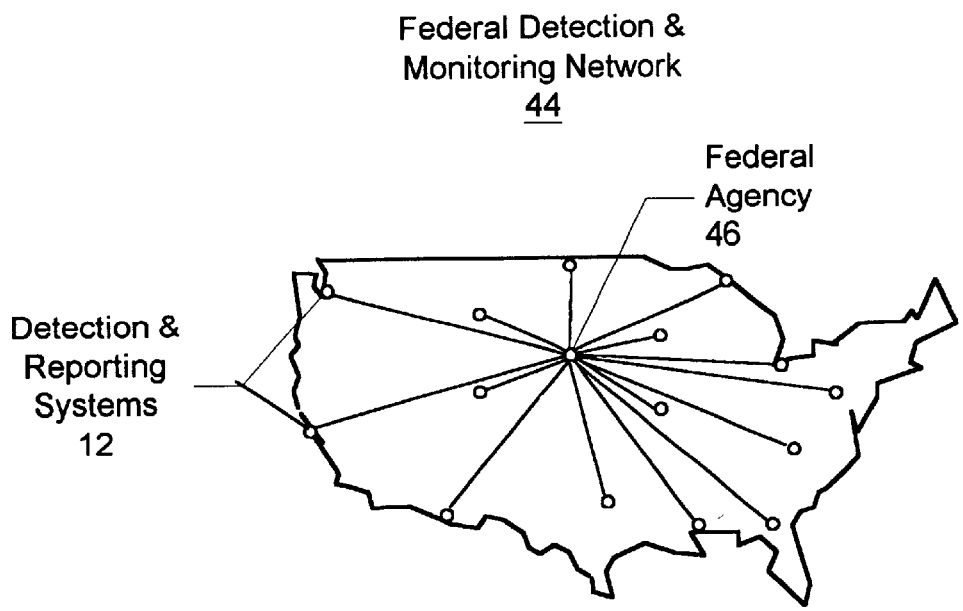

FIG. 2 is a diagram illustrating a regional detection and monitoring network, and FIG. 3 is a diagram illustrating a federal detection and monitoring network. In the regional detection and monitoring network 40 shown in FIG. 2, the port-of-entry detection and reporting system 12 in those states report to a regional agency 42. In the federal detection and monitoring network 44 shown in FIG. 3, the port-of-entry detection and reporting systems 12 are located at state and federal borders and report to a federal agency 46, such as the Environmental Protection Agency.

Figure 4:
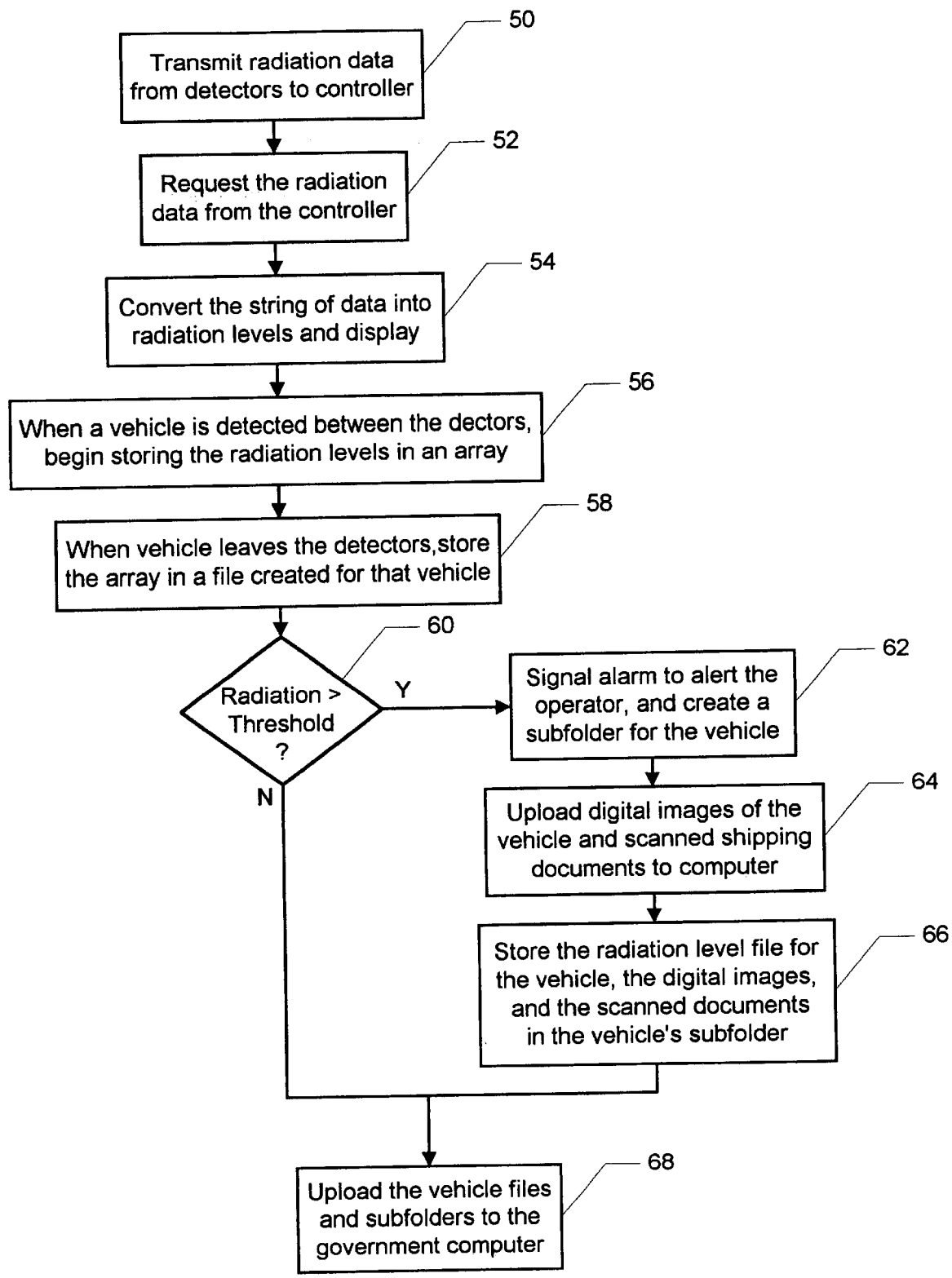
FIG. 4 is a flow chart illustrating a method for detecting and monitoring noncompliant interstate transportation of radioactive materials.

FIG. 4 is a flow chart illustrating a method for detecting and monitoring noncompliant interstate transportation of radioactive materials in accordance with the present invention. In a preferred embodiment, the process begins once the detectors 14a begin transmitting radiation data to controller 14b in step 50. With commercial detection systems 14, the detectors typically transmit data on a continual basis, and controller 14b filters background radiation. The software application 24 periodically requests the radiation data from the controller 14 (e.g., wherein the central computer allows the respective vehicles to be monitored by comparing the levels of material detected in the vehicle at each port-of-entry to determine approximately when or where the vehicle acquired a non-compliant load. 1/sec.) and receives the data as a string of characters in step 52. The software application 24 then converts the string into radiation levels and displays the radiation levels on the computer 16 for an operator in step 54.

When a vehicle is detected between the detector assemblies 14a, the software application 24 begins storing the radiation levels in an array in step 56. Once the vehicle leaves the detection assemblies 14a, the application 24 associates the measured radiation levels with the vehicle by storing the array in a file created for the vehicle in step 58. In a preferred embodiment, the file is identified by a vehicle number that is assigned to each vehicle that passes through the detector units.

It is then determined if the detected levels of radiation exceed a predetermined threshold in step 60. This may be done by comparing a geometric mean of the detectors 14a and a calculation of the vehicle surface reading with a predetermined threshold. If the radiation levels exceed the threshold, then an alarm is signaled to alert the operator and the application 24 creates a subfolder for the vehicle for storing pictures from the digital camera 18 and images from scanner in step 62. Thereafter, pictures of the identification markings on the vehicle taken by the digital camera 18 and scanned copies of the vehicle's shipping documents created by the scanner 20 are uploaded to the computer 16 in step 64.

In one preferred embodiment, the picture taking and scanning is performed manually by an operator. If the vehicle is a truck or car, the vehicle can be instructed to pull to the side of the road for this process. However, in another preferred embodiment, the digital camera 18 may be integrated with the port-of-entry computer 16 for automatic picture taking, assuming that the operator can control the camera 18 from the computer 16. The radiation level file for the vehicle, the images of the vehicle, and the scanned shipping documents are stored in the vehicle's subfolder in step 66. The vehicle files and subfolders are then uploaded to the government agency computer 22 in step 68 either on a batch or individual basis. In the case of an alarm, the vehicle's subfolder may be uploaded immediately.

If the port-of-entry computer 16 and the government agency computer 22 are connected via a modem, then the upload process may be made more secure by requiring that the port-of-entry computer 16 first dial the government-agency computer 22 and after communication is made, hangs up. In response, the government agency computer 22 then calls back the port-of-entry computer 16. Once a connection is made, the government agency computer 22 appears as a disk drive on the port-of-entry computer 16, and the operator of the port-of-entry computer 16 may drag and drop selected files and folders to the government agency computer 22.

If the port-of-entry computer 16 and the government agency computer 22 are connected via a secure connection or via the Internet, then the files may be uploaded from the port-of-entry computer 16 automatically and stored in a database on the government agency computer 22. In addition, an encryption protocol can be used to protect the file transfers and deter hackers.

Figure 5:
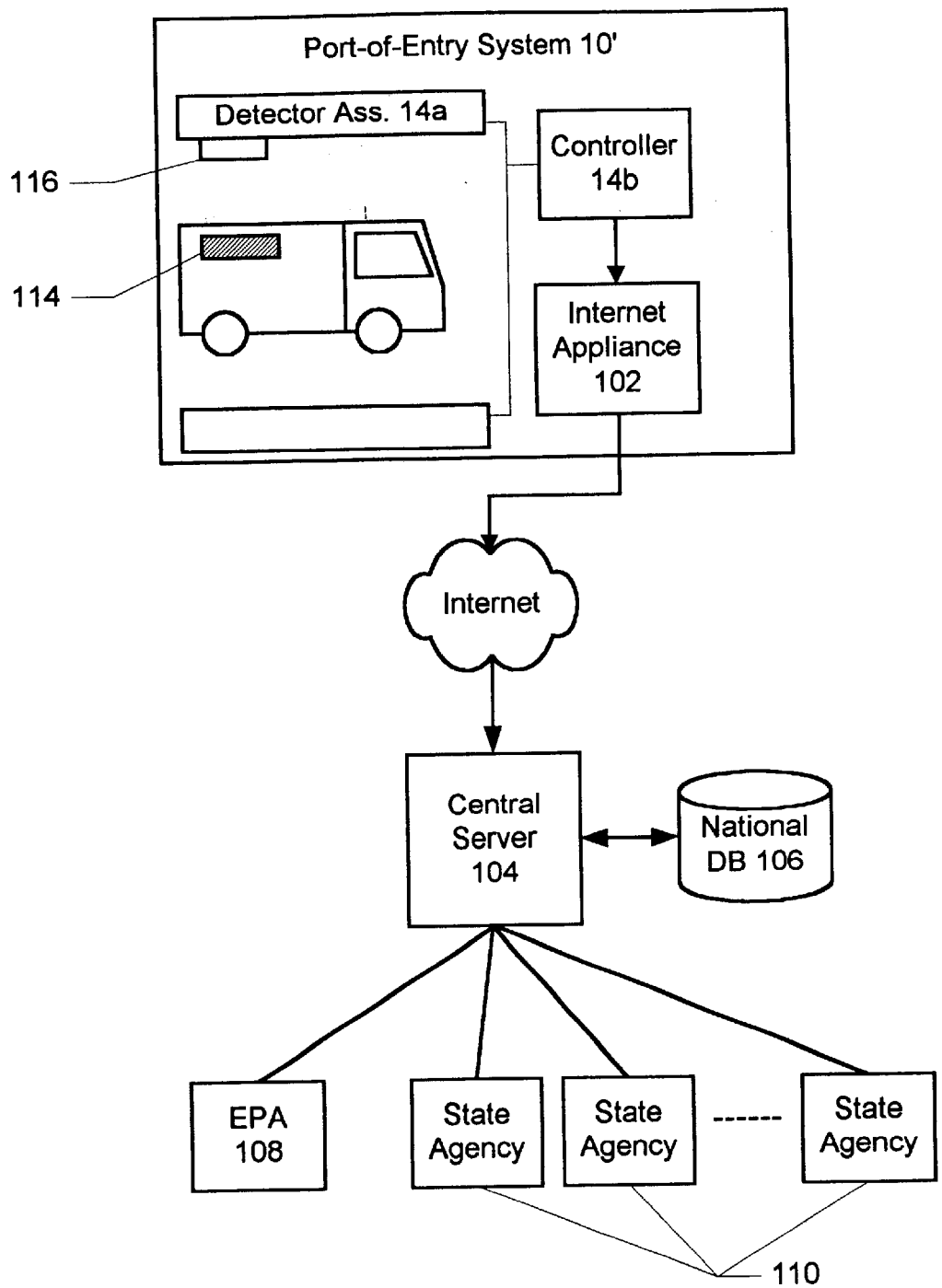
FIG. 5 is a block diagram illustrating a detection and monitoring network in accordance with a second embodiment of the present invention.

FIG. 5 is a block diagram illustrating a detection and monitoring network in accordance with a second embodiment of the present invention, where like components from FIG. 1 have like reference numerals. The second embodiment provides a server-based detector and monitoring network 100, where all port-of-entry systems 10'include an internet appliance 102 or modem that is connected to a central server 104 via a common carrier, the Internet or dedicated network. The central server 104 maintains a national database 106 for vehicles, which is indexed on a unique vehicle identification number. The central server 104 is also accessible by the Environmental Protection Agency 108, as well as state agencies 110.

The second embodiment of the present invention assumes the existence of a federal regulation that requires all cars and trucks to bear an identification mark, such as a bar-code 114, containing a unique vehicles identification number. Assuming that the law requires the bar-code 114 be placed on cars and trucks in standard positions, the detection assemblies 14a at each port-of-entry could be provided with bar-code scanners 116. This monitoring system could include a tracking system using transponders tracked by satellite similar to those on Waste Isolation Pilot Project (WIPP) transportation vehicles or those used by the ONSTAR™ tracking system.

In operation, as each vehicle passes the detection assemblies 14a, the bar-code 114 is scanned for the identification number (and any optional shipping information). The Internet appliance 102 then saves the vehicle's detector readings in a file named after the identification number, and uploads the file to the server 104. Alternatively, the vehicle identification number may be saved in the file itself. Once uploaded to the server 104, the detector readings in the file are stored in the national database 106 under the vehicle's record.

When a vehicle triggers an alarm, the server 104 may automatically notify the Environmental Protection Agency 108 for the appropriate action. In addition, the database 106 is accessible by the state agencies 110 for queries.

According to the present invention, the detection and monitoring systems of the present invention allow the federal government to monitor shipments across the country. For example, if a vehicle enters a state and passes through a port-of-entry for that state without causing an alarm, but then enters the adjoining state and triggers an alarm, either the government agency computer 22 or the national database 106 can be accessed to determine that the vehicle must have picked up the noncompliant load in the first state. The proper authorities can then be dispatched to investigate the source of the contaminant.

A detection and monitoring network has been disclosed that protects the public from the transportation of noncompliant and illegal materials across state and federal borders. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for detecting and monitoring noncompliant interstate transportation of a material, the method comprising the steps of:
   (a) providing a detection and monitoring network whereby multiple ports-of-entry are each equipped with a detection system that is in communication with a central computer;
   (b) using the detection systems to detect levels of the material in vehicles passing through each of the ports-of-entry;
   (c) associating the levels of material detected for each vehicle with the respective vehicle;
   (d) saving the vehicle material levels on a computer; and
   (e) uploading the vehicle material levels detected at each port-of-entry to the central computer for monitoring and review,
      wherein the central computer allows the respective vehicles to be monitored by comparing the levels of material detected in the vehicle at each port-of-entry to determine approximately when or where the vehicle acquired a non-compliant load.

2. The method of claim 1 wherein step (b) further includes the step of using the detection systems to detect levels of radiation.

3. The method of claim 2 wherein step (c) further includes step of: saving the detected levels of material for each vehicle in an electronic file.

4. The method of claim 3 wherein step (c) further includes step of: when the radiation levels exceed a predetermined threshold, issuing an alarm to alert an operator.

5. The method of claim 4 wherein step (c) further includes step of: taking pictures of identification markings on the vehicle using a digital camera, and uploading the pictures with the file to the central computer.

6. The method of claim 5 wherein step (c) further includes step of: scanning the vehicle's shipping documents, and uploading the scanned documents with the file to the central computer.

7. The method of claim 1 wherein the detector systems further include a controller that receives a stream of detected data from the detector systems, step (c) further including steps of:
   (i) providing the computer with a software application for extracting the stream of detector data from the controller,
   (ii) associating the detector data with respective vehicles, and
   (iii) saving the data in a file.

8. The method of claim 1 further including step of allowing a government agency to control the central computer.

9. The method of claim 1 wherein step (a) further includes step of: locating the multiple ports-of-entry in multiple states to create a regional network, wherein the multiple ports-of-entry report to a regional agency.

10. The method of claim 1 wherein step (a) further includes step of: locating the multiple ports-of-entry at state and federal borders to create a federal network, wherein the multiple ports-of-entry report to a federal agency.

11. An interstate transportation detection and monitoring network, comprising:
   a central computer; and
   a plurality of detection and reporting systems in communication with the central computer, wherein each detection and reporting system is located at a vehicle port-of-entry and includes,
      a detector system for measuring levels of a material in vehicles,
      a computer coupled to the detector system, the computer for
         processing data detected by the detectors for each vehicle, and
         transferring the data to the central computer for monitoring, wherein the central computer allows the respective vehicles to be monitored by comparing the levels of material detected in the vehicle at each port-of-entry to determine approximately when or where the vehicle acquired a non-compliant load.

12. The system of claim 11 wherein the computer saves the data detected for each vehicle in a file.

13. The system of claim 12 wherein a digital camera and a scanner are connected to the computer.

14. The system of claim 13 wherein when levels of the material are detected for a vehicle that pass a predetermined threshold, a folder is created for storing the file, digital images of the vehicle taken by the digital camera, and electronic copies of the vehicle's shipping documents scanned by the scanner.

15. The system of claim 14 wherein the contents of the folder are uploaded to the remote computer.

16. The system of claim 11 wherein the remote computer and the plurality of detection and reporting systems form a regional network that is controlled by a regional agency.

17. The system of claim 11 wherein the remote computer and the plurality of detection and reporting systems form a federal network that is controlled by a federal agency.

18. The system of claim 11 wherein the detector system includes detector assemblies mounted on each side of a vehicle pass-through and a controller.

19. The system of claim 18 wherein the detector system detects radiation levels.

20. The system of claim 18 wherein the detector system detects bombs.

21. The system of claim 18 wherein the detector system detect drugs.

22. A server-based detection and monitoring network, comprising:
  a central server for maintaining a national database for vehicles, wherein each vehicle is identified by an identification number;
  an identification mark located on vehicles in a standard position, the identification mark including the vehicle's identification number;
  a plurality of port-of-entry systems, each port-of-entry including an Internet appliance coupled to the central server via a network, and detector systems for detecting levels of a material inside vehicles, wherein the detector systems further include a scanner for reading the identification mark, such that as each vehicle passes the detection assemblies, the identification mark on the vehicle is scanned for the identification number, the internet appliance associates the vehicle's identification number with a file and saves the detector readings for the vehicle in the file, and a uploads file to the central server for storage in the national database.

23. The network of claim 22 wherein the central server allows shipments to be monitored across the country by checking entries in the national database for the vehicles that have picked up a noncompliant material.

24. The network of claim 23 wherein the central server is controlled by a federal agency.

25. The network of claim 24 wherein the federal agency is the Environmental Protection Agency.

26. The network of claim 24 wherein the federal agency is the Department of Transportation.

27. A method for detecting and monitoring noncompliant interstate transportation of radioactive materials, the method comprising the steps of:

(a) providing detection systems at a plurality of interstate ports-of-entry, wherein each detection system includes detector assemblies for detecting radiation located on each side of a vehicle pass-through, a controller coupled to the detector assemblies, a computer coupled to controller, and a digital camera coupled to the computer;

(b) transmitting radiation data from a detector to the controller;

(c) periodically requesting by the computer radiation data from the controller;

(d) converting the radiation data into radiation levels and displaying the radiation levels;

(e) when a vehicle is detected between the detector assemblies, storing the radiation levels in file and capturing digital images of the vehicle with the digital camera;

(f) determining if the radiation levels exceed a predetermined threshold;

(g) if the radiation levels exceed the predetermined threshold, signaling an alarm to alert an operator; and (h) uploading the file to a central computer.
  wherein the central computer allows the respective vehicles to be monitored by comparing the levels of material detected in the vehicle at each port-of-entry to determine approximately when or where the vehicle acquired a non-compliant load.

28. The method of claim 27 wherein step (c) further includes the step of: receiving the radiation data as a stream of characters.

29. The method of claim 28 wherein step (e) further includes the step of: storing the radiation levels in array until the vehicle leaves the detector assemblies.

30. The method of claim 29 wherein step (e) further includes the steps of: assigning a vehicle number to each vehicle that passes through the detector assemblies, and identifying the file by the vehicle number assigned to vehicle.

31. The method of claim 30 wherein step (f) further includes the step of comparing a geometric mean of the detectors and a calculation of a vehicle surface reading with the predetermined threshold.

32. The method of claim 31 wherein step (g) further includes the step of:
  allowing the operator to create a subfolder and storing the images in the subfolder.

33. The method of claim 32 wherein step (g) further includes the step of:
  storing scanned shipping documents for the vehicle with the file.

34. The method of claim 33 wherein step (h) further includes the step of:
  (i) requiring that the computer for dial the central computer and hanging up after communication is made; and
  (ii) in response, the remote computer calls back the computer, and appears as a disk drive on the computer, thereby allowing the operator of the computer to drag-and-drop selected files and folders to the central computer.

* * * * *

UNITED STATES PATENT AND TRADEMARK OFFICE
CERTIFICATE OF CORRECTION

PATENT NO. : 6,601,022 B2
DATED : July 29, 2003
INVENTOR(S) : William D. Zerwekh et al.

It is certified that error appears in the above-identified patent and that said Letters Patent is hereby corrected as shown below:

Title page,
Item [73], Assignee, replace "AZ" with -- NM --.

Column 1,
Line 32, after "a" add -- road --.

Column 4,
Line 2, delete "wherein the central computer allows the respective vehicles to be monitored by comparing the levels of material detected in the vehicle at each port-of-entry to determine approximately when or where the vehicle acquired a non-compliant load."

Signed and Sealed this

Eleventh Day of May, 2004

JON W. DUDAS
*Acting Director of the United States Patent and Trademark Office*